United States Patent [19]

Martin-Lopez

[11] Patent Number: 4,926,037

[45] Date of Patent: May 15, 1990

[54] APPARATUS AND METHOD TO CONTROL THE PRECISIONAL POSITION OF A LIGHT WEIGHT MOTOR ENERGIZED BY RADIANT ENERGY

[76] Inventor: Fernando R. Martin-Lopez, 967-E La Mesa Ter., Sunnyvale, Calif. 94086

[21] Appl. No.: 276,105

[22] Filed: Nov. 23, 1988

[51] Int. Cl.$^5$ .............................................. G01J 1/32
[52] U.S. Cl. ..................................... 250/205; 356/216
[58] Field of Search ................ 356/216; 250/205, 216, 250/239, 231 SE

[56] References Cited

U.S. PATENT DOCUMENTS

| | | | |
|---|---|---|---|
| 182,172 | 9/1876 | Crookes | 356/216 |
| 1,000,831 | 8/1911 | Martin | 356/216 |
| 4,397,150 | 8/1983 | Paller | 60/641.8 |
| 4,410,805 | 10/1983 | Berley | 290/1 R |
| 4,431,306 | 2/1984 | Estey et al. | 356/216 |

FOREIGN PATENT DOCUMENTS 1395137 5/1975 United Kingdom .

Primary Examiner—David C. Nelms
Attorney, Agent, or Firm—Flehr, Hohbach, Test, Albritton & Herbert

[57] ABSTRACT

A motor position controller energized by radiant energy, includes a member that rotates in response to radiant energy. A sensing means is mounted adjacent the absorbing member to sense rotational movement of the member and to generate a member rotational speed and direction movement signal in response thereto. A processor compares input command signals representing the desired member speed and rotational direction signal with the actual speed and rotational direction signal and generates a radiant energy control signal in response thereto. A radiant energy generating laser, controlled by the processor, transmits radiant light energy of varying magnitude onto the member thereby controlling the member's rotational speed, direction and position. In a preferred embodiment, the member is mechanically engaged to a mechanical joint and is used to control the arm's speed, position and movement.

29 Claims, 4 Drawing Sheets

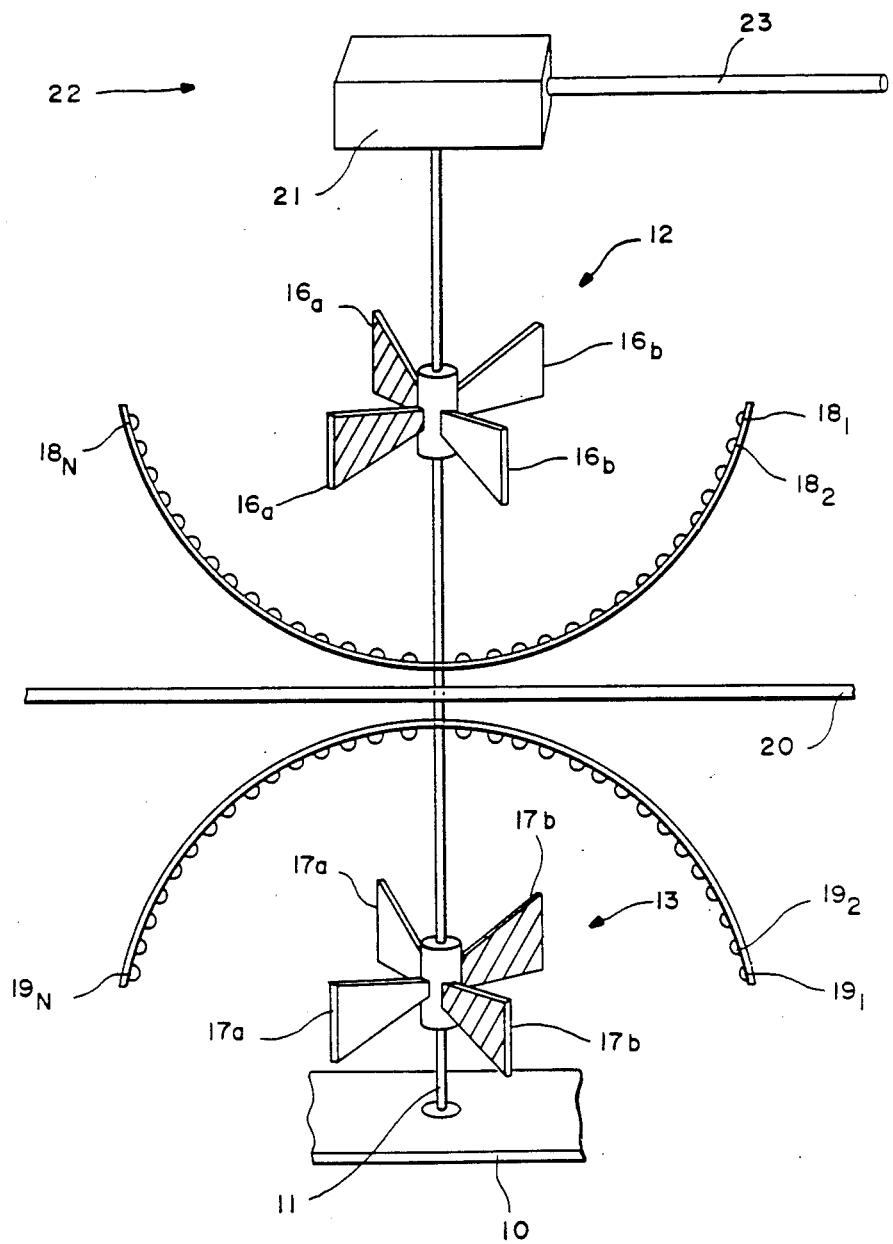
FIG.—1

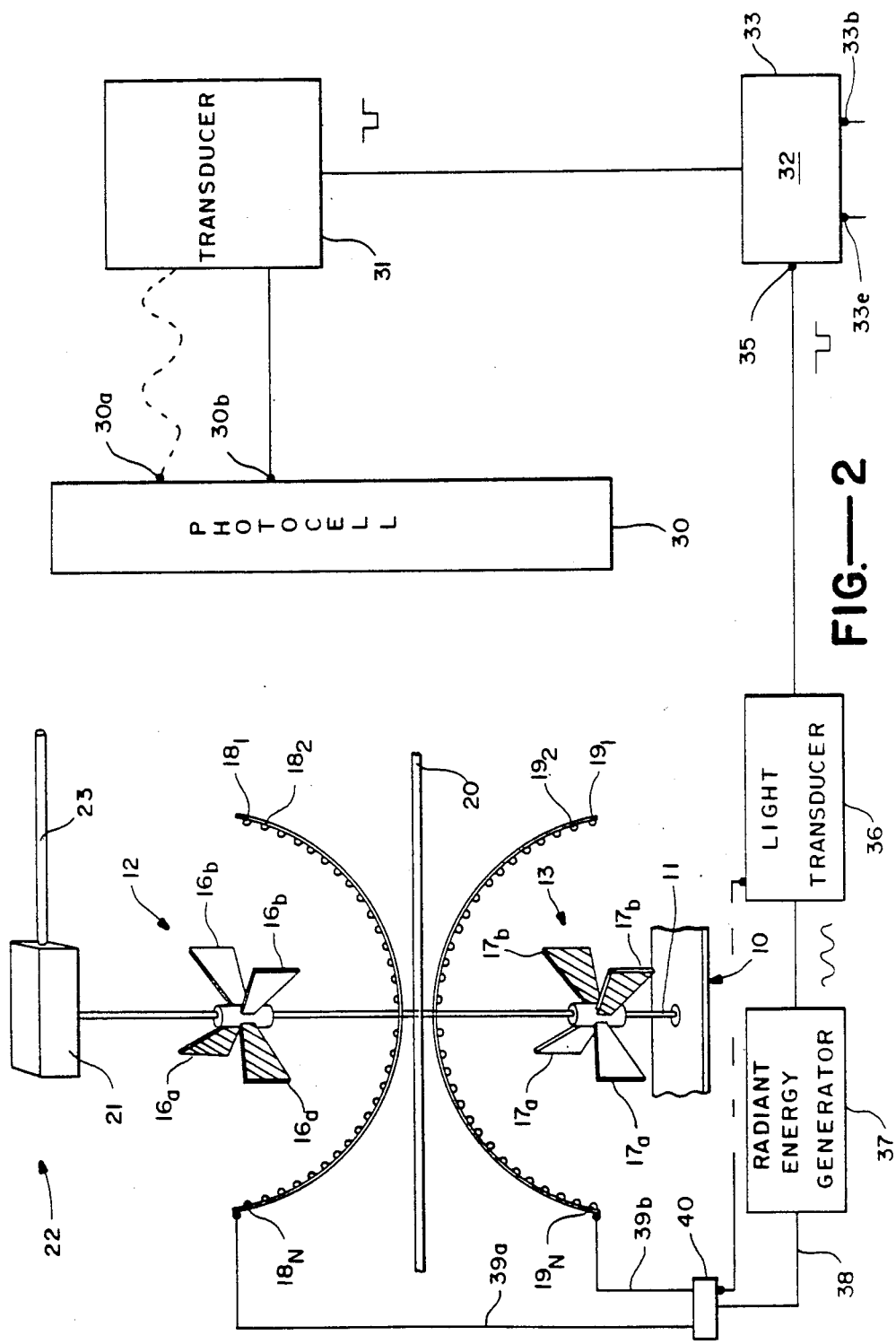
FIG.—2

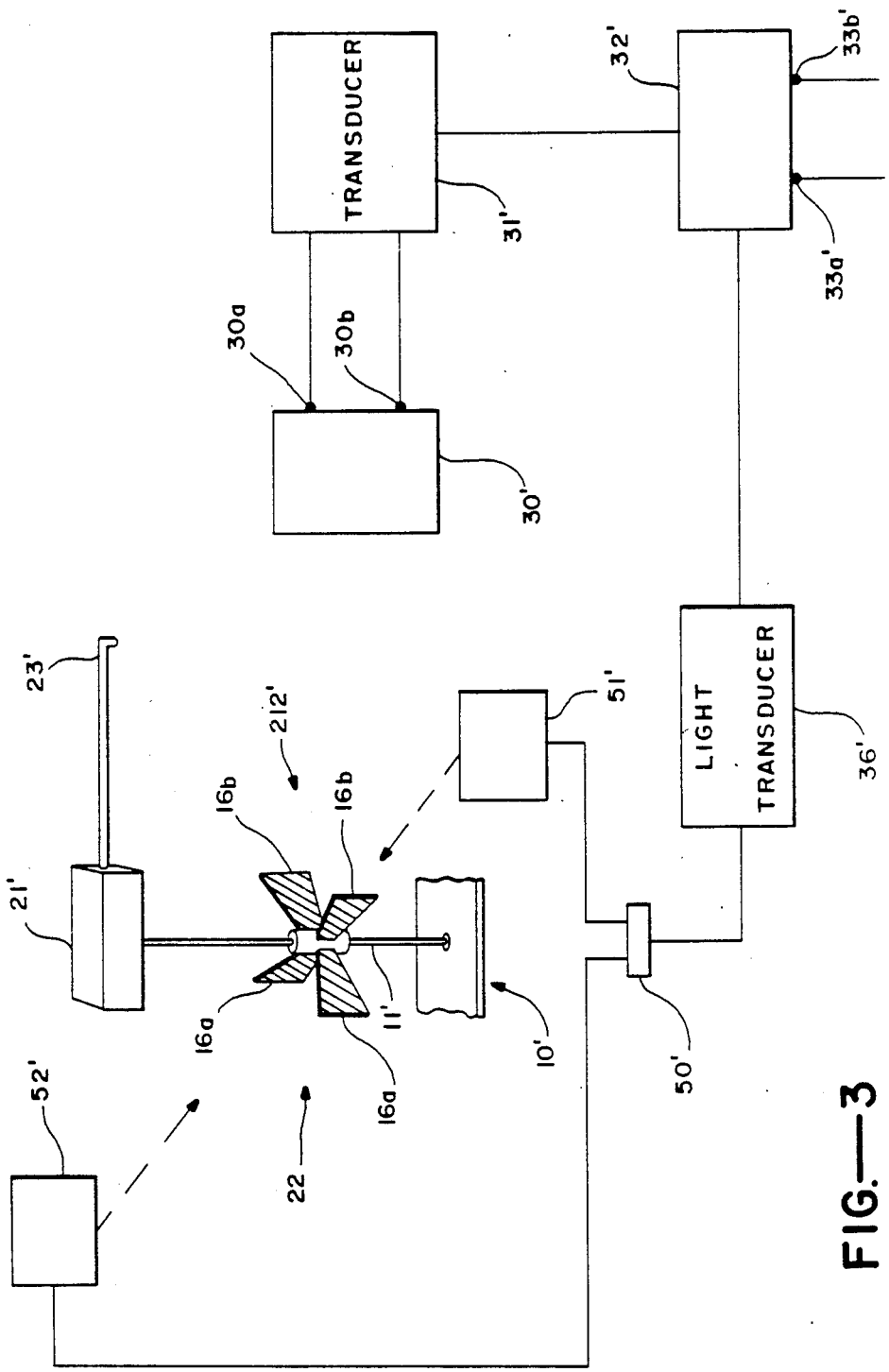
FIG.—3

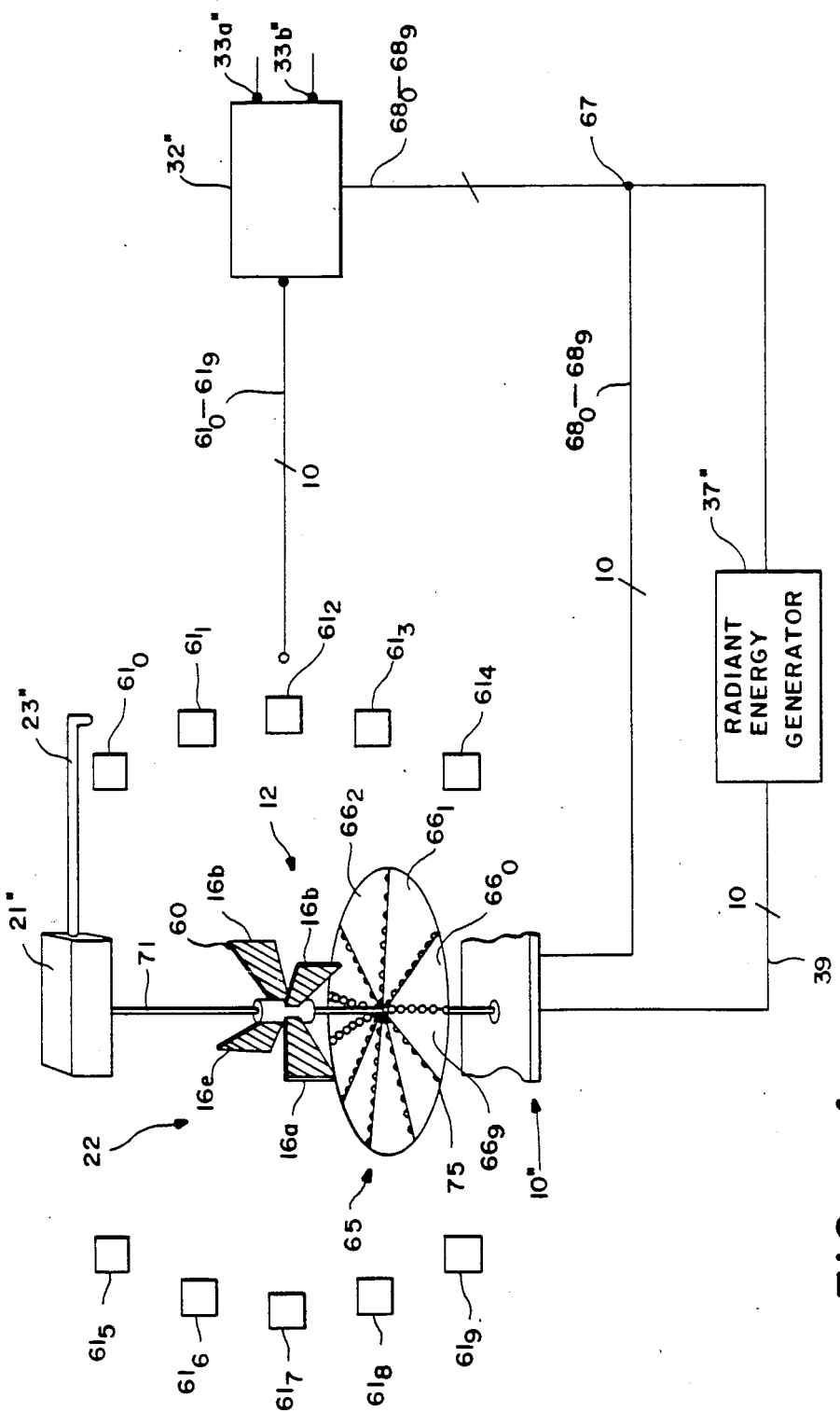
FIG.—4

APPARATUS AND METHOD TO CONTROL THE PRECISIONAL POSITION OF A LIGHT WEIGHT MOTOR ENERGIZED BY RADIANT ENERGY

FIELD OF THE INVENTION

The present invention relates generally to a radiant energy controlled plastic motor and more particularly to an apparatus and process for controlling the rotational speed and precisional position of a radiant energy motor.

DESCRIPTION OF THE PRIOR ART

Crookes was the first to discover and describe a device which absorbs incident radiation energy and converts it into mechanical energy. In U.S. Pat. No. 182,172, issued to Crookes on Sept. 12, 1876, an instrument which has come to be known as the radiometer, was disclosed. The Crookes radiometer included a plurality of light weight planar surfaces adapted to rotate about a common vertical member. The planar surfaces are blackened on one side, and brightened on the other side, and are arranged so that all the black surfaces are facing the same direction. When incident radiation is applied to the planar surfaces, the incident radiation is absorbed by the black sides of the planar surfaces and repelled by the bright sides, thereby inducing rotational movement. Although a scientific explanation for the conversion of radiant energy to movement of the planar surfaces is unknown, the end result is the radiant energy is converted to mechanical energy.

The Crookes radiometer failed to obtain any practical applications, and its scope of usefulness was confined to a laboratory curiosity for many years. See for example, U.S. Pat. No. 1,000,831 which discloses a radiometer utilized to measure radiation intensity.

More recently, radiometer devices which produce useful work have been proposed. U.S. Pat. No. 4,410,805 issued to Berley and U.S. Pat. No. 4,397,150 issued to Paller both propose a radiometer generator to derive an output of electrical energy. Berley and Paller respectively teach a radiometer that is mechanically coupled to a torque convertor of an electric metal inductor generator motor. As the energy absorbing surfaces rotate, the electric generator will generate electricity which is then utilized for useful purposes. The Berley and Paller inventions have limited usefulness. Metal induction generators tend to be extremely heavy, and require vasts amounts of input radiant energy to generate sufficient electricity for useful applications. In British Patent No. 1,395,137, a radiometer device energized with laser beams is taught.

Therefore, there is a need for an apparatus and a method to control the positional position of a light weight motor by controlling the radiant energy input.

SUMMARY OF THE INVENTION

An object of the invention is to provide a light weight motor capable of being energized by a radiometer.

Another object of the invention is to provide a motor to control the movement of a mechanical devices, as for example, a mechanical joint.

Another object of the invention is to provide a radiometer capable of controlling rotational speed and precisional movement of a plastic motor with radiant energy generated by a laser beam directed through fiber optics.

To achieve the forgoing and other objects of the invention and in accordance with the purpose of the apparatus and method for a motor position controller there is provided a radiant energy motor. The motor includes a member that rotates in response to radiant energy. A sensor is mounted adjacent the member and senses rotational movement of the member to generate a member rotational speed and direction signal in response thereto. A processor compares input signals representing the desired speed and rotational direction of the member with the actual speed and rotational direction of the member, and generates a radiant energy control signal in response thereto. A radiant energy generating laser, electrically connected to receive the radiant energy control signal from the processor, transmits radiant light energy of varying magnitude in response to the control signal onto the member. In a preferred embodiment of the invention, the motor controller is used to control the precisional position of a mechanical joint or the like.

BRIEF DESCRIPTION OF THE DRAWINGS

Additional objects and features of the invention will be more readily apparent from the following detailed description and appended claims when taken in conjunction with the drawings, in which:

FIG. 1 is a diagrammatic view of an embodiment of the present invention having a two rotor radiometer mechanically connected to a mechanical joint.

FIG. 2 is a block diagram of the controller for controlling rotational movement of the radiometer and motor of FIG. 1.

FIG. 3 is a block diagram of an alternative embodiment according to the present invention including a pair of opposed lasers for turning the rotor in opposite directions.

FIG. 4 is a view of another embodiment of the present invention incorporating a single rotor with all its sides blackened and the necessary optics to drive the rotor.

DESCRIPTION OF THE PREFERRED EMBODIMENT

The present invention relates to a plastic motor and more specifically a plastic motor energized and controlled by radiant energy. A light weight, plastic radiometer motor vastly increases the mechanical energy output derived from a radiant energy input, and thus permits the present radiometer device to accomplish practical work, such as the control of the precisional movement of a robotic arm.

A processor is utilized to receive control input signals, monitor present motor signals, and to generate therefrom a control signal to vary the amount of radiant energy input. In this manner, the rotational speed and direction of the motor can be controlled.

Referring now to the drawings, and in particular FIG. 1, there is shown an embodiment of the plastic radiometer device utilized by the present invention. A plastic support 10 provides a structural base for a plastic drive shaft member 11. Drive shaft 11 is free to rotate in a clock wise or a counter clock wise rotation congruent to support 10. A first rotor 12 is mounted to the top portion of drive shaft 11. Rotor 12 is engaged to rotate in a clock wise direction, effectuating a clock wise rotation of drive shaft 11. A second rotor 13 is circumferentially mounted to the bottom portion of drive shaft 11. Rotor 13 is engaged to rotate in a counter clock wise direction, effectuating a counter clock wise rotation of drive shaft 11.

The rotor 12 has a plurality of flat energy absorbing/emitting surfaces 16 comprising a light weight plastic extending outward about rotor's 12 periphery. Each surface 16 has a dark radiant energy absorbing side 16a and a light radiant energy reflecting surface 16b.

The rotor 13 has a plurality of flat energy absorbing/emitting surfaces 17 comprising a light weight plastic extending outward about rotor's 13 peripheral. Each surface 17 has a dark radiant energy absorbing side 17b and a light radiant energy reflecting surface 17a. Sides 17a and 17b are arranged so that liked colored sides are all facing the same direction, but in an opposite direction as the same colored sides 16a and 16b of rotor 12.

It will be appreciated that in order to maximize performance, it is desirable to maximize the radiant energy absorption characteristics of sides 16a and 17b, while maximizing the radiant energy reflection characteristics of sides 16b and 17a respectively. By way of example, in the embodiment chosen for purposes of illustration, the darkened sides 16a and 17b may be coated with a blackened sulfide layer, and light sides 16b and 17a may be coated with a magnesium carbonate layer.

A radiant energy emitting array 18, having a plurality of optic laser emitting windows $18_1 \ldots 18_n$, is arranged to direct radiant light energy to reflect off rotor 12 surfaces 16a and 16b. A second radiant energy emitting array 19, having a plurality of optic laser emitting windows $19_1 \ldots 19_n$, is arranged to direct radiant light energy off rotor 13 surfaces 17a and 17b. Optical windows $18_1 \ldots 18_n$ and $19_1 \ldots 19_n$ are made of a transparent materials which directs radiant energy to the respective rotor surface 16a, 16b, 17a and 17b when radiant light energy is present in the radiant energy emitting arrays 18 or 19.

A light shield 20 is mechanically positioned between top rotor 12 and bottom layer 13 to prevent radiation energy emitted from array 18 intended to fall on sides 16a and 16b of rotor 12 from striking sides 17a and 17b of rotor 13. Conversely, light shield 20 prevents radiation energy emitted from array 19 intended to fall on sides 17a and 17b of rotor 13 from striking sides 16a and 16b of rotor 12.

In the aforementioned arrangement with the rotor 12 blackened sides 16a facing the opposite direction of bottom rotor 13's blackened sides 17b, the direction of drive shaft 11 rotation can be controlled by directing radiant energy at either top rotor 12 (clock wise) or bottom rotor 13 (counter clock wise).

A torque convertor 21 is mechanically connected to the top end portion of shaft 11. Torque convertor 21 is further engaged to rotate in response to any rotational movement of shaft 11. Together, drive shaft 11, rotors 12 and 13, and torque convertor 21 comprise a motor 22. A mechanical joint or artificial limb 23 is mechanically connected to plastic motor 22 at torque convertor 21. With a clockwise rotation of rotor 12, mechanical joint 23 moves forward a predetermined distance. Conversely, with a counter clockwise rotation of rotor 13, the mechanical joint 21 will move backward a predetermined distance.

It will be appreciated by those skilled in the art that in order to increase mechanical output of the present invention, the plastic motor 22 elements including drive shaft 11, rotors 12 and 13 surfaces 16a, 16b, 17a and 17b, torque convertor 21 and mechanical joint 23 are all made of a light weight material. In the embodiment chosen for the purpose of illustration, the material chosen is plastic. Among other possible light weight constituent materials include but are not limited to ceramic, wood, superconductive material, and fiber glass.

Referring to the block diagram of FIG. 2, a controller for the plastic motor 22 is described. A photocell 30 is mounted adjacent to rotors 12 and 13 and is adapted to sense rotations of rotors 12 and 13. photocell 30 generates a sine wave output corresponding to each rotational movement of either rotor 12 or 13. If rotor 12 or 13 makes a partial rotation, for example 180°, then photocell 30 will generate ½ a sine wave. When rotor 12 or 13 makes a full 360° rotation, photocell will generate a full sine wave. Output 30a located on photocell 30 provides an output means to transmit the sine wave. At photocell output port 30b, photocell 30 is also arranged to generate a positive polarity signal in response to forward rotational movement of rotor 12, or a negative polarity signal in response to a reverse rotational movement of rotor 13. The polarity of the signal photocell output 30b may be used to detect the direction of rotor movement.

An RPM. transducer 31 is electrically connected to receive the signals from photocell outputs 30a and 30b. Transducer 31 converts each 180° sine wave peak into a square wave pulse. When the transducer 31 detects a positive polarity signal from 30b, the transducer 31 is arranged to output a square wave pulse of positive polarity signifying the forward motion of mechanical joint 23. Conversely, when the transducer 31 detects a negative polarity signal of 30b, the transducer 31 is arranged to output a square wave pulse of negative polarity signifying the reverse motion of mechanical joint 23.

Two complete square wave pulses is equivalent to a full 360° rotation of a rotor 12 or 13. The frequency of the pulses is directly proportional to the rotational speed of the rotor. In effect, by counting the frequency and by acknowledging the polarity of transducer 31 square wave output, it provides a means to determine the exact rotor speed and rotational direction, and thereby track the exact location of mechanical joint 23.

A processor 32 is electrically connected to receive the square wave pulse output from transducer 31 at processor input port 32a. In a preferred embodiment, processor 32 is a microprocessor. Positional tracking of mechanical joint 23 is accomplished in the following manner. The position of mechanical joint 23 is determined by summing the current mechanical joint 23 position and predetermined distance of movement of mechanical joint 23 in the forward direction corresponding to each positive pulse. When the pulses are of negative polarity, the predetermined distance of movement corresponding to each negative polarity pulse is subtracted from the mechanical joint's current position. Processor 32 determines the actual robot speed by monitoring the frequency of the square wave pulses.

Processor 32 input ports 33a and 33b receive input command signals signifying the desired mechanical joint speed and positional movement respectively. Processor 32 compares the actual mechanical joint 23 position and speed with the desired mechanical joint speed and position signals. A square wave pulse train control signal is generated at processor output port 35 in response to the comparison. The radiant energy square wave control signal is characterized by two components; polarity and frequency. When forward movement of mechanical joint 23 is required to move mechanical joint 23 from its current position to the desired position, the square waves are of positive polarity. When a reverse motion of mechanical joint 23 is necessary to move mechanical joint 23 to its desired position, the square waves are of negative polarity. The frequency of the square wave control signal is directly proportional to the desired robot 23 arm speed of movement.

A light transducer 36, electrically connected to processor output port 35, is adapted to receive the radiant energy square wave control signal. Light transducer 36 comprises a digital frequency pulse-to-analog convertor generates an analog signal with a magnitude directly proportional to the frequency of the radiant energy square wave control signal. The polarity of the analog signal is identical to the polarity of the radiant energy square wave control signal.

A radiant energy generator 37, electrically connected to the output of light transducer 36, is adapted to accept the light transducer output signal. In the preferred embodiment, radiant energy generator 37 is an integrated laser chip. The radiant energy generator 37 transmits a laser through fiber optic 39 with an intensity proportional to the analog signal from light transducer 36.

An optical switch 40 is optically connected to the to light transducer 36 via fiber optic 39. Optical switch 40 operates in response to the polarity of the analog signal created by light transducer 36. When the analog signal is of positive polarity, indicating that a forward motion of mechanical joint 23 is desired, optical switch 40 will direct the laser beam through fiber optic 39a to light emitting array 18, thereby effectuating clockwise rotation of rotor 12. When the analog signal is of negative polarity, indicating that a reverse motion of mechanical joint is desired, optical switch 40 will direct the laser beam to light through fiber optic 39b to emitting array 19, thereby effectuating a counter clock wise rotation of rotor 13. A high intensity laser will effectuate fast rotations of either rotor 12 or 13. A low intensity laser will effectuate slower rotations of either rotor 12 or 13.

Referring next to FIG. 3, an alternative embodiment to the invention will be described with a single rotor 12' arranged to rotate in both a clockwise and a counterclockwise direction. Rotor 12' is similar to the rotors 12 and 13 of the first embodiment except each side of surfaces 16 (or 17) are blackened. Clockwise rotational movement of rotor 12' is effectuated by applying radiant energy onto blackened side 16'b of surface 16'. Counterclockwise rotational movement of rotor 12' is achieved by applying radiant energy onto side 16'a of surface 16'.

Base 10', drive shaft 11', rotor 12', torque converter 21' and plastic motor 22' are all mechanically positioned in a similar manner as shown in the embodiment of FIGS. 1 and 2. A mechanical joint or artificial limb 23' is mechanically connected to plastic motor 22' at torque convertor 21'. Mechanical joint 23' moves forward a predetermined distance with a clockwise rotation of rotor 12'. Conversely, the mechanical joint 23' will move backward a predetermined distance with a counter clockwise rotation of rotor 12'.

A photocell 30' is mounted adjacent to rotor 12' and is adapted to sense rotations of rotor 12'. Photocell 30' generates a complete sine wave output corresponding to each 360° rotational movement of rotor 12' at photocell output port 30a'. At output port 30b', photocell 30' is arranged to generate a positive polarity signal in response to clockwise rotational movement of rotor 12', and a negative polarity signal in response to a counter clockwise rotational movement of rotor 12'.

The aforementioned steps performed by the transducer 31, processor 32 and light transducer 36 of the first embodiment are duplicated in this second embodiment by transducer 31', processor 32' and light transducer 36'.

Light transducer 36' generates an analog wave form with a magnitude directly proportional to the frequency of the radiant energy square wave control signal generated by processor 32'. The polarity of the analog signal is also identical to the polarity of radiant energy square wave generated by processor 32'.

An electrical switch 50' is electrically connected between light transducer 36' output and a two radiant energy generators 51' and 52'. Switch 50' operates to direct light transducer's 36' output analog signal to radiant energy generator 51' when the polarity of the analog signal is positive. When the polarity of the analog signal is negative, switch 50' will direct the analog signal to radiant energy generator 52'.

Radiant energy generator 51' is positioned in front of rotor 12' to direct radiant energy onto rotor 12' surfaces 16a'. Radiant energy generator 51' will generate a radiant energy laser beam when energized by a positive polarity analog signal from light transducer 38'. The energy absorbed at rotor 12' surface 16a', thereby effectuating rotor 12' clockwise rotation. The intensity of radiant energy generated by radiant energy generator 51' is directly proportional to the magnitude of the analog signal of light transducer 36'. Therefore, a high magnitude analog signal will produce a high intensity laser from generator 51', and rotor 12' will rotate clockwise at a fast rotational speed.

Radiant energy generator 52' is positioned behind rotor 12' to direct radiant energy onto rotor 12' surfaces 16b'. Radiant energy generator 52' generates a radiant energy laser beam when energized by a negative polarity analog signal and the energy is absorbed at surface 16'b of rotor 12'. The intensity of radiant energy generated by radiant energy generator 52' is directly proportional to the magnitude of the analog signal. A high magnitude analog signal will produce a high intensity laser from generator 52', thereby effectuating faster counter clock wise rotational movement of rotor 12.

In yet another embodiment according to the invention, referring in particular to FIG. 4, there is shown a plastic radiometer device utilized by the present invention. Plastic base 10'', drive shaft 11'', rotor 12'' with each surface 16''a and 16''b blackened, torque converter 21'', and plastic motor 22'' are all mechanically positioned in a similar manner as described above in conjunction with FIG. 3. Rotor 12'' is free to rotate in a clockwise rotation when radiant energy intensity is greater on surfaces 16''b of rotor 12''. Conversely, rotor 12'' is free to rotate in counterclockwise rotations in response when radiant energy intensity is greater on surfaces 16''a of rotor 12''. Mechanical joint 23'' moves a predetermined forward distance in response to clockwise rotations of rotor 12'', and a predetermined reverse distance in response to counter clockwise rotations of rotor 12''. An LED 60 is mechanically engaged to a surface 16. LED 60 acts as a reference point for determining full rotations of rotor 12. LED 60 is of low intensity so as not to offset the rotational movement of the rotor. Therefore, a light shield is not necessary.

A light emitting array 65, comprising ten photoemitting window tracks 66$_0$, through 66$_9$, are arranged in a star pattern so that each track is spaced 36 apart from one another. Each track contains a multiplicity of optic windows 18" positioned to direct radiant energy onto the surfaces 16a" and 16b", respectively. The light array 65 is mechanically engaged about the periphery of drive shaft 11" and is located directly below rotor 12". Light array 65 is arranged to disperse radiant energy onto rotor 12" sides 16a" and 16b" in a manner hereinafter discussed.

Ten photosensors, 61$_0$ through 61$_9$ are arranged circumferentially around rotor 12". The photosensors 61$_0$ through 61$_9$ are located 36 degrees apart and are adapted to sense rotor 12" movement in 36 segments. As rotor 12" rotates in a clock wise direction, LED 60 will first pass under photosensor 61$_0$, and then 61$_1$, ... and finally to 61$_9$. The photocells output changes from a logical low to a high with a passage of LED 60. Photosensors 61$_0$ through 61$_9$ generate a sequencing upward ten bit word with the clockwise rotation of rotor 12". When red LED 60 completes a rotation and returns to photosensor 61$_0$, it signifies a complete rotation of rotor 12", and the photosensor outputs are all reset to logical low. The sequencing upward process is repeated with the continued clockwise rotation of rotor 12".

As rotor 12" rotates in a counter clock wise direction, red LED 60 will first pass under photosensor 61$_9$, and then 61$_8$, and finally to 61$_0$. The photocells output changes from a logical high to a low with each passage of red LED 60.

The ten bit word will appear to sequence downward with a counter clock wise rotation of rotor 12". When red LED 60 completes a rotation and returns to photosensor 61$_0$, it signifies a complete 360 counter clock wise rotation of rotor 12", and the photosensor outputs are all reset to logical high. The sequencing downward process is repeated with the continued counter clockwise rotation of rotor 12.

Processor 32" is electrically connected to receive the ten photodiode output 61$_0$ through 61$_9$ signals at its input ports 72$_0$ through 72$_9$ respectively. Processor 32" is arranged to detect rotational direction by acknowledging that an upwardly counting bit word signifies clock wise rotation of rotor 12", and a downward counting word signifies counter a clockwise rotation of rotor 12".

Processor 32" is arranged to detect rotational speed in either direction by monitoring the rate of change of the sequencing bits comprising the 10 bit word. The faster the bits sequence up, the faster the rotor 12" is rotating in a clock wise movement. The faster the bits sequence down, the faster the rotor 12" is rotating in a counter clock wise movement.

Processor 32" processes the 10-bit words for the purpose of determining the exact position of rotor 12" to a 36 angle of certainty. Each 36 movement of rotor 12" corresponds to a predetermined distance of movement of mechanical joint 23". For example, with each bit increment processor 32" will acknowledge that rotor 12" is rotating in a clockwise direction, and mechanical joint 23" has moved a predefined distance in the forward direction. Conversely, with each bit word decrement processor 32" acknowledges that rotor 12" is moving in a counter clockwise direction and, mechanical joint 23" has moved a predefined distance in the reverse direction. In this manner, processor 32" can accomplish exact positional tracking of mechanical joint 23".

Processor 32" receives at input ports 33"a and 33"b input command signals signifying desired mechanical joint speed and positional movement, respectively. Processor 32" compares the actual mechanical joint 23" position and speed with the desired mechanical joint 23" speed and position signals. Processor 32" is arranged to generate an encoded 10-bit radiant energy control signal 67 at processor 32" output ports 68"$_0$ through 68"$_9$ in response to the comparison. Each bit of the 10-bit output 68$_0$ through 68$_9$ corresponds to and is intended to control one track 66$_0$ through 66$_9$ of light array 65.

A radiant energy generator 37", is arranged to generate a radiant energy laser beam 38". A fiber optic 39" connected between radiant energy generator 37" and the light emitting array 65", provides an optical transmission path for the laser beam. Radiant energy generator 37" provides a constant source of radiant energy to be emitted throughout the light emitting array 65".

The encoded outputs 68$_0$ through 68$_9$ are designed to effectuate several types of movement. To initial clockwise rotational movement of rotor 12" when it is at rest, processor 32" will generate an encoded signal which will in turn light only the photoemitting diode tracks immediately adjacent to the current position of rotor 12" surfaces 16a". This provides a radiant energy source of higher intensity on the side 16a" of rotor 12" than side 16b". Accordingly, rotor 12" begins to rotate in a clockwise direction.

To initialize a counter clockwise rotation of rotor 12", processor 32" will generate an encoded signal which will in turn light the photoemitting diode tracks immediately adjacent to the current position of sides 16b". The radiant energy present on the 16b" surfaces of rotor 12" is greater than that on the 16a" surfaces. Accordingly, rotor 12" rotates in a counter clockwise rotation.

To sustain constant clockwise rotor rotation, processor 32" generates encoded output signals 68$_0$ through 68$_9$ which control light emitting array 65 in the following manner. As the rotating surfaces 16 pass over the photoemitting diode tracks, the tracks are momentarily energized by the processor encoded output signals 68$_0$–68$_9$. The tracks are individually lit for a sufficient time period to enable radiant energy to fall upon the front sides 16a" of rotor 12". As back side of 16b" approaches the lighted diode track in front of it, processor 32" will shut the lighted diode tracks off, and turn on the next adjacent diode tracks which are now closest to sides 16a". The same technique is utilized to effectuate counter clockwise rotation.

To stop the clockwise rotational movement of rotor 12", processor 32" will generate an encoded output 68$_0$–68$_9$ which will energize the diode tracks immediately in front of the rotating sides 16a. The radiant energy dispersed will create a mechanical force opposite the direction the rotor surfaces 16" are rotating, thereby effectuating breaking of the rotor 12". The same technique is used to stop counter clockwise rotation of rotor 12".

By utilizing the aforementioned rotational techniques, the processor 32" can track movement of the mechanical joint 23 to a 36° of precision. It would be obvious to one skilled in the art that a higher number of tracks 66 in light array 65 permits for higher precisional resolution of precisional positioning of the mechanical joint 23.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a motor energized by radiant energy, an apparatus to control motor drive rotation, comprising:

a drive member adapted to rotate in response to radiant energy, a radiant energy emitting member adapted to emit radiant energy to said drive member, a sensor means mounted adjacent said drive member and adapted to sense rotational movement of said drive member and to generate a member rotational speed and direction signal, processor for comparing an input command signal representing desired speed and rotational direction of said motor drive shaft with said member rotational speed and direction signal and to generate a radiant energy control signal in response thereto, and radiant energy distributing means, electrically connected to said processor means for receiving said radiant energy control signal, and responsive to said control signal to cause said radiant energy emitting member to vary the emission level of said radiant energy in response thereto.

2. The apparatus of claim 1, further comprising a motor drive mechanically engaged to said drive member and adapted to rotate in response to said drive member rotations, and a mechanical joint mechanically engaged to said motor drive and adapted to move a predefined distance in response to rotational movement of said motor drive.

3. The apparatus of claim 2, wherein said mechanical joint moves a predefined forward distance in response to clock wise rotations of said member, and a predefined reverse distance in response to counter clock wise rotations of said member.

4. The apparatus of claim 1, wherein said sensor means comprise a photocell adapted to generate a rotational speed sine wave output in response to the rotational speed of said drive member, and positive polarity in response to clockwise rotations of said member, or a negative polarity in response to counter clock wise rotations of said member.

5. The apparatus of claim 4, wherein said sensor further comprises a transducer electrically connected to receive direction signal sine wave output and said positive or negative polarity signal, and to generate an output square wave pulse corresponding to each peak of said sine wave and of a polarity corresponding to said polarity signal to be provided to said processor.

6. The apparatus of claim 5, wherein said processor is a processor electrically connected to receive and compare said input command signal and said transducer output square wave pulse, and adapted to generate said radiant energy control signal further characterized by a square wave train with a frequency corresponding to desired member rotational frequency and polarity corresponding to member rotational direction.

7. The apparatus of claim 6, further comprising a light transducer electrically connected to said processor and for receiving said radiant energy control signal and converting said radiant energy control signal into an analog signal characterized by magnitude and polarity whereby said analog signal is provided to said radiant energy distributing means.

8. The apparatus of claim 7, wherein said radiant energy means comprises an integrated laser chip electrically connected to receive said analog signal characterized by magnitude and polarity and adapted to generate light radiant energy with an intensity proportional to the magnitude of said analog signal and directing said radiant energy onto said drive member.

9. The apparatus of claim 8, said drive member comprising a first rotor adapted to rotate in a clock wise direction to effectuate clock wise rotations of said motor drive, and a second rotor, located below said first rotor, adapted to rotate in a counter clock wise direction to effectuate counter clock wise rotations of said motor drive.

10. The apparatus of claim 9, wherein said first rotor comprising a first plurality of flat energy absorbing/emitting surfaces extending outward about said first rotor periphery, and said second rotor comprising a second plurality of flat energy absorbing/emitting surfaces extending outward about said second rotor periphery.

11. The apparatus of claim 10, wherein said first plurality of flat energy absorbing/emitting surfaces each comprise two sides, a first side blackened with an energy absorbing layer of sulfide, and a second side lightened with an energy emitting layer of magnesium carbonate, said blackened sides of each said surface all facing the same direction.

12. The apparatus of claim 11, wherein said second plurality of flat energy absorbing/emitting surfaces comprise two sides, a first side lightened with an energy emitting layer of magnesium carbonate, and a second side darkened with an energy absorbing layer of sulfate, and said blackened sides of each said surface facing the same direction.

13. The apparatus of claim 12, wherein said blackened sides of said first energy absorbing/emitting surfaces face the opposite direction of said blackened sides of said second energy absorbing/emitting surfaces.

14. The apparatus of claim 9, wherein said radiant energy emitting means further comprises a first radiant energy emitting array, optically connected to said integrated laser chip by a first fiber optic, said first radiant energy emitting array comprising a plurality of optic emitting diodes arranged to direct light radiant energy onto said first rotor surfaces, a second radiant energy emitting array, optically connected to said integrated laser chip by a second fiber optic, said second radiant energy emitting array comprising a plurality of optic emitting diodes arranged to direct light radiation energy onto said second rotor surfaces to effectuate said rotor rotations.

15. The apparatus of claim 14, further comprising a switch located on said integrated laser chip and adapted to switch radiant energy to said first fiber optic to effectuate clock wise rotation of said first rotor responsive to said light transducer analog signal of positive polarity, or to switch radiant energy to said second fiber optic to effectuate counter clock wise rotation of said second rotor when said light transducer analog signal is of negative polarity.

16. The apparatus of claim 15 wherein clockwise rotations of said first rotor prevents counter clockwise rotations of said second rotor, and counter clockwise rotations of said second rotor prevents clockwise rotations of said first rotor.

17. The apparatus of claim 16, further comprising a light shield mechanically arranged between said first rotor and said second rotor adapted to shield radiant energy emitted from said first energy emitting array from falling onto said second rotor, and to shield radiant energy emitted from said second energy emitting array from falling onto said first rotor.

18. The apparatus of claim 7, wherein said rotating member comprises a single rotor adapted to rotate in a clock wise or a counter clock wise rotation to effectuate clock wise or counter clock wise rotations of said motor drive.

19. The apparatus of claim 18, wherein said rotor comprises a plurality of surfaces extending outward about said rotor periphery, each surface comprising a first and a second side blackened with an energy absorbing layer of sulfide.

20. The apparatus of claim 19, further comprising a polarity sensitive electrical switch electrically connected between said light transducer and a said first radiant energy generator and a second radiant energy generator, said electrical switch directing said analog signal to first radiant energy generator when said analog signal is of positive polarity, and directing said analog signal to said second radiant energy generator when said analog signal is of negative polarity.

21. The apparatus of claim 20, wherein said first radiant energy generator comprises a first integrated laser chip electrically connected to receive said analog signal characterized by magnitude and polarity, and a second integrated laser chip, and a second radiant energy generator comprising a second integrated laser chip.

22. The apparatus of claim 21, wherein said first integrated laser chip is positioned to direct radiant energy onto said first side of said rotor surfaces to effectuate clock wise rotation of said rotor, and said second integrated laser chip is positioned to direct radiant energy onto said second side of said rotor surfaces to effectuate counter clock wise rotations.

23. The apparatus of claim 3, wherein said rotating member comprises a single rotor adapted to rotate in a clock wise or a counter clock wise rotation to effectuate clock wise or counter clock wise rotations of said motor drive.

24. The apparatus of claim 23, wherein said rotor comprises a plurality of surfaces extending outward about said rotor periphery, each surface comprising a first and a second side blackened with an energy absorbing layer of sulfide.

25. The apparatus of claim 24, wherein said radiant energy emitting member comprises a light emitting array of a plurality of photoemitting tracks arranged in a star pattern below said surfaces and adapted to emit radiant energy onto said surfaces, each said track spaced a preset number of degrees apart.

26. The apparatus of claim 25, wherein said sensor means further comprises a plurality of photosensors arranged circumferentially around said rotor, each designated a predetermined number of degrees apart, said photosensor outputs, together, adapted to generate a binary word, wherein said binary word sequences upward with clock wise rotations of said rotor, and sequences downward with counter clock wise rotations of said rotor.

27. The apparatus of claim 26, wherein said processor comprises a processor electrically connected to receive said binary word, and said input command signal representing desired rotor speed and rotational direction and to generate in response thereto said radiant energy control signal comprising an encoded binary word, said encoded binary word controlling said light array to effectuate forward precisional movement of said rotor, reverse precisional movement of said rotor, and precisional positioning of said rotor.

28. The apparatus of claim 1, wherein said member adapted to rotate and said motor drive comprise a light weight plastic material.

29. In a motor energized by radiant energy, a method to control motor drive rotation, comprising the steps of:
    rotating a member in response to radiant energy,
    mechanically engaging to said member a motor drive shaft adapted to rotate in response to said radiant member rotations;
    sensing rotational movement of said member rotational speed and direction signal in response thereto,
    comparing an input command signal representing desired speed and rotational direction of said motor drive shaft with said member rotational speed and direction signal and generating a radiant energy control signal in response thereto, and
    generating variations of radiant energy responsive to said radiant energy control signal, and
    transmitting said variations of radiant energy to said member thereby effectuating controlled rotation of said member.

* * * * *